Nov. 17, 1931.    J. A. JOHNSON    1,832,399
DELIVERY MEANS FOR RECEPTACLE CLOSURE CAP ASSEMBLING MACHINES
Filed July 19, 1930    3 Sheets-Sheet 1

Inventor
J. A. Johnson
By John O. Seifert
Attorney

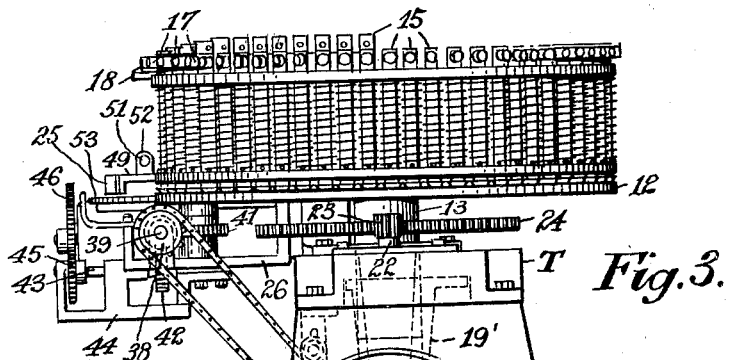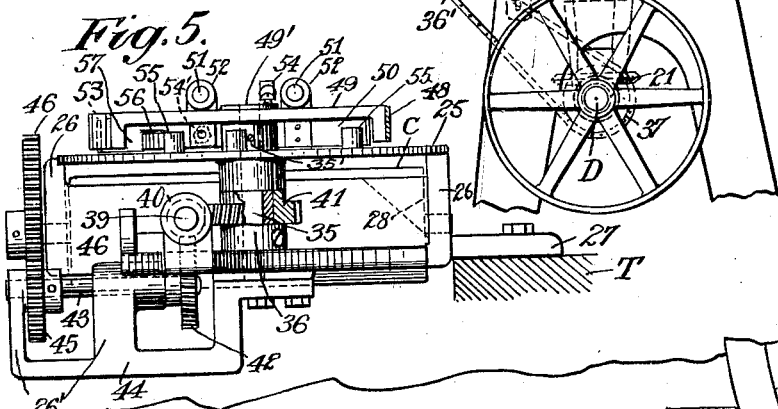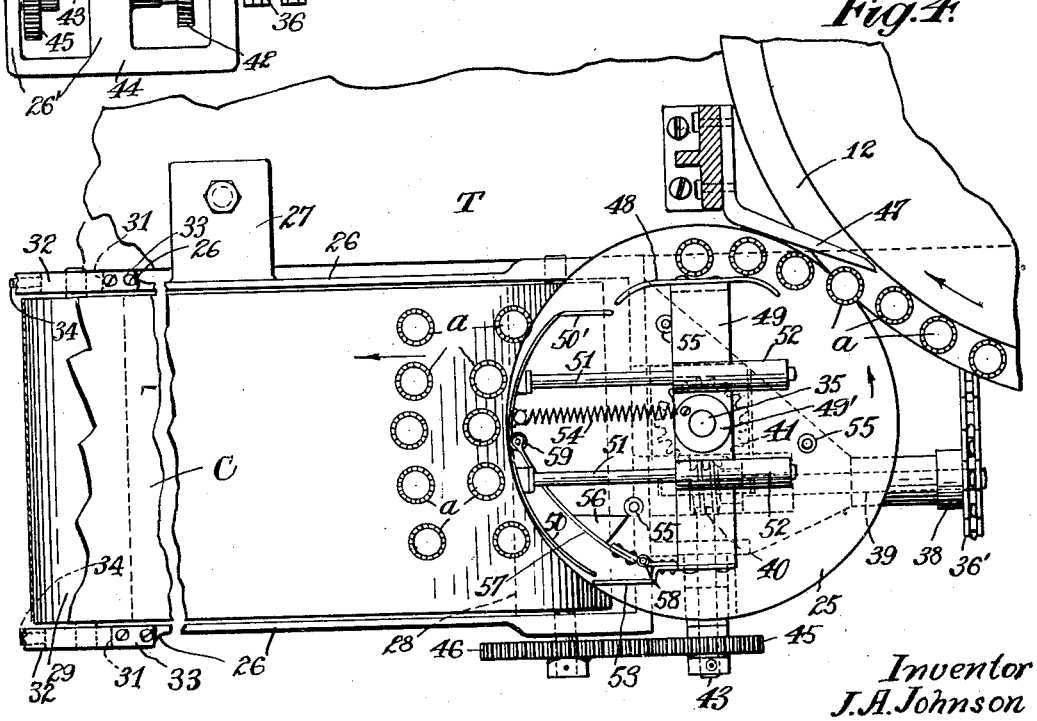

Nov. 17, 1931.  J. A. JOHNSON  1,832,399
DELIVERY MEANS FOR RECEPTACLE CLOSURE CAP ASSEMBLING MACHINES
Filed July 19, 1930  3 Sheets-Sheet 3
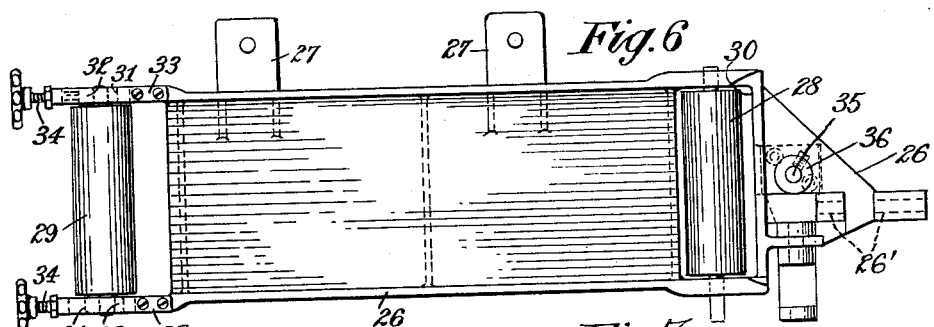
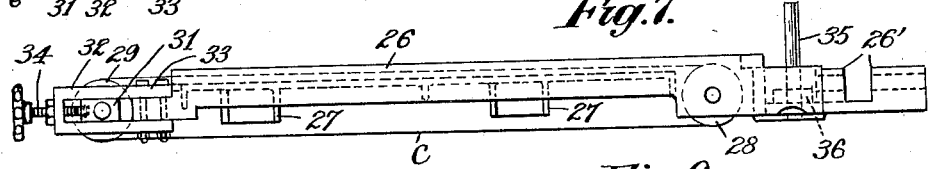
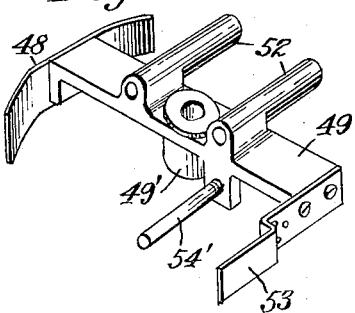 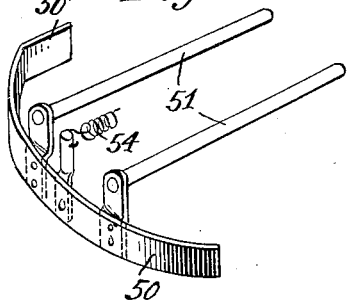
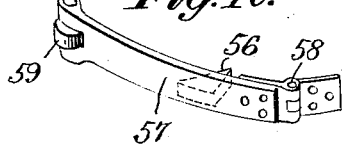 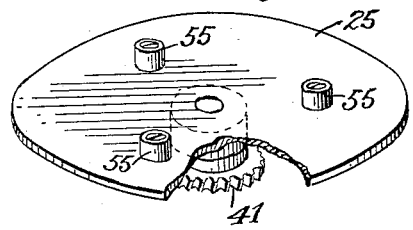
Inventor
J. A. Johnson
By John O. Seifert
Attorney Patented Nov. 17, 1931

1,832,399

UNITED STATES PATENT OFFICE

JOHN A. JOHNSON, OF BROOKLYN, NEW YORK

DELIVERY MEANS FOR RECEPTACLE CLOSURE CAP ASSEMBLING MACHINES

Application filed July 19, 1930. Serial No. 469,051.

This invention relates to delivery means for machines for assembling sealing pads in receptacle closure caps, and particularly to an arrangement which will permit of an inspection of the caps during the delivery thereof, and to provide an assemblage of the delivery means in relation to the assembling means whereby the operator who observes the operation of the cap assembling means may also inspect the assembled caps as they are delivered and thus obviate the necessity of an additional operator to inspect the finished caps as they are delivered, and to provide means for this purpose which is simple in construction and efficient in operation.

In receptacle closure cap assembling apparatus of this character there is provided a table upon which the operative mechanism is supported to deliver and assemble sealing pads, such as cork disks, with an adhesive in caps as they are transported along a support mounted on the table, the caps being delivered to said support at one end of the table and the assembled caps being delivered from said support at the opposite end of the table to means to place the sealing pads in the caps under pressure for a predetermined length of time to assure adhesion of the pads to the caps, and it is a further object of the invention to provide delivery means embodying a belt conveyor arranged alongside of and traveling in relation to the assembling mechanism carrying table and to provide improved means for effecting a transfer of the assembled caps from the pressure applying means to the conveyor.

Other objects and advantages will hereinafter appear.

In the drawings accompanying and forming a part of this application Figure 1 is a plan view of one end of the assembling machine showing the pressure applying means and an embodiment of my improved means for transferring caps therefrom to the inspection conveyor, only so much of the assembling machine being shown as is essential to an understanding of the invention.

Figure 3 is an end elevation looking at the right of Figure 2.

Figure 4 is a plan view, on an enlarged scale, of the transferring means and showing the parts in another position.

Figure 5 is an end elevation, partly in section, of the conveyor and transferring support and the actuating means therefor.

Figure 6 is a plan view of the supporting means for the conveyor and transferring means.

Figure 7 is a side elevation of the supporting means for the conveyor and transferring means and looking at the bottom of Figure 6.

Figures 8, 9 and 10 are perspective views of details of means for transferring the caps from a rotatable table to the conveyor; and Figure 11 is a perspective view, partly broken away, of the rotatable table to receive caps from the pressure applying means and from which table the caps are transferred to the conveyor.

Figure 1:
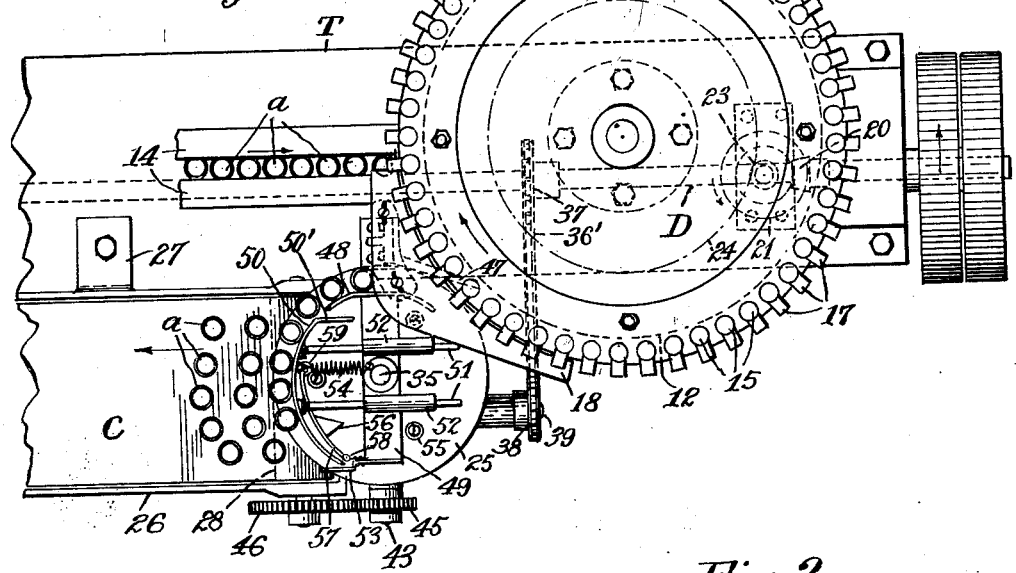

In the embodiment of the invention illustrated only so much of the assembling machine is shown as is essential to an understanding of the invention, and including means, commonly termed as an assembling or finishing head, for subjecting sealing pads assembled in caps to pressure for a predetermined length of time, said head comprising a disk or shelf portion 12 having a hub 13 whereby it is mounted on a shaft to rotate on a vertical axis at one end of a table T of the cap assembling mechanism, the caps being transported along supporting rails 14 mounted on the table engaging opposite marginal portions of the caps and from which supporting rails the caps are delivered to the shelf 12 of the pressure applying means relative to plungers 15 circumferentially disposed about the head and yieldingly urged toward the shelf 12 by springs 16. During that portion of the travel of the head relative to the delivery end of the cap supporting rails 14 the plungers are moved away from the table and retained in said position by studs 17 fixed in and extended from the plungers laterally beyond the periphery of the head riding up a cam member 18 carried by posts 19 fixed on the table. The finishing head and assembling mechanism are operated from a drive shaft D journaled in hangers 19′ fixed to the bottom of the table T, said shaft being connected with the head by a bevel pinion 20 on said drive shaft meshing with a bevel gear 21 fixed to a vertical shaft 22, and a pinion 23 on said latter shaft meshing with a gear 24 fixed to the head hub 13, said parts being rotated in the direction of the arrows indicated in Figures 1 and 2.

The assembled caps are delivered from the finishing head to delivery means embodying a table in the form of a disk 25 to receive the caps from the head and transport the caps and from which they are transferred to a belt conveyor C. The belt conveyor and disk are carried by a bracket 26, (Figures 6 and 7,) which bracket is in the nature of a shelf having spaced arms 27 extended from one side and whereby it is mounted upon the table T to extend laterally and longitudinally thereof. The conveyor is supported by said frame by a pair of drums 28, 29, the drum 28 being rotatably mounted in a recess portion 30 at one end of the bracket and the other drum 29 journaled in bearing blocks 31 slidably mounted in U-shaped members 32 fixed at the free ends of the legs thereof to portions projecting from the end at opposite sides of the frame, as at 33, the bearing blocks being adapted to be adjusted by screws 34 connected thereto to take up slack in the conveyor belt.

Figure 2:
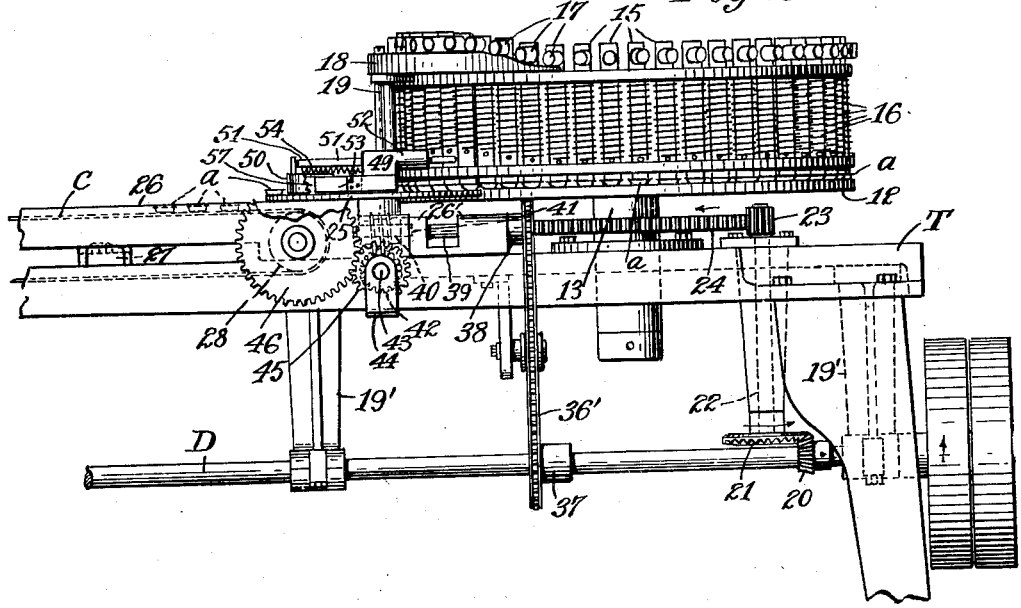
Figure 2 is a side elevation of the parts shown in and looking at the bottom of Figure 1 and partly broken away to show certain features of the means to transfer the caps to the inspection and delivery conveyor.

The disk 25 is rotatably mounted on a vertical shaft 35 (Figure 5) fixed in a hub 36 of an extended portion of the bracket 26 in interposed relation to the conveyor C and the finishing head and arranged to rotate in the plane of the cap receiving shelf 12 of the head with a peripheral portion in contiguous relation to said shelf and another peripheral portion superposed to and overhanging the end of the conveyor C, as shown in Figures 1 and 2. The disk and conveyor are driven from the drive shaft D of the assembling machine by a sprocket chain 36′ passing around a sprocket wheel 37 on the drive shaft and a sprocket wheel 38 fixed to a shaft 39 journaled in bearings 26′ of the extension of the conveyor supporting bracket 26 and having a worm 40 fixed thereon meshing with a worm wheel 41 rotatable with the disk 25 and a worm wheel 42 fixed to a shaft 43 journaled in a sub-bracket 44 fixed to the bracket 26 and said shaft 43 operatively connected with the conveyor drum 28 by a pinion 45 fixed on the shaft meshing with a gear 46 fixed to the shaft of drum 28. The ratio of the gearing is such so that the disk 25 is rotated at an increased speed relative to the rotation of the finishing head and the speed of travel of the belt conveyor C.

The peripheral portion of the disk 25 adjacent the shelf 12 of the pressure means carrying head is in the region where the plungers are moved to and supported in position away from the caps by the cam 18, and the caps are delivered and directed from the head shelf 12 to the disk 25 by a finger 47 (Figure 4) carried by a bracket fixed upon the table T of the assembling machine to extend above and diagonally of the head shelf. The caps, indicated by a, by the rotation of the head engage with and are directed by said finger onto the disk 25 and by the rotation of the latter are advanced from the finger and guided to a peripheral portion of the disk by a guide 48 fixed to the end of a bracket 49 (Figure 8) in the form of a bar having a perforated hub 49′ intermediate the ends whereby it is mounted on the shaft 35 above the disk 25 and secured thereto, as by a pin 35′. The caps are directed by the guide 48 to a peripheral portion of the disk in front of a plate 50 (Figures 1 and 9) of arcuate shape, said plate being in the nature of an ejector operative intermittently from the rotation of the disk for transferring or ejecting the caps from the disk to the conveyor C, said plate being secured in edgewise relation to the disk 25 by a pair of rods 51 slidably mounted in parallel tubular portions 52 of the bracket 49 arranged at diametrically opposite sides of the bracket hub 49′, the one end 50′ of said plate being bent in angular relation to the body of the plate to extend within the one end of the guide 48 to prevent the caps from being delivered from guide 48 to the rear of plate 50. The opposite end of the plate 50 terminates within a further guide member 53 secured to the end of the bracket 49 opposite to the guide 48 to prevent caps on disk 25 in front of the ejector plate 50 from being transported by the disk 25 beyond the side of the conveyor C. The plate 50 is yieldingly urged to predetermined position within the periphery of the disk, as shown in Figure 1, by a spring 54, said movement being limited by the plate engaging a stud fixed in the bracket 49 and extending in parallel relation to one of the rods 51, as shown at 54′ in Figure 8. The plate 50 is actuated intermittently in a direction toward the periphery of the disk and in the direction of travel of the conveyor C to transfer caps from the disk to the conveyor by a series of abutments, in the present instance three in number and in the form of studs 55 fixed in and equidistantly spaced about the disk, successively engaging a cam member 56 fixed intermediate the ends of a lever 57 pivotally supported at 58 on the guide member 53, the opposite end carrying a roller 59 engaging the plate 50 intermediate its supporting rods 51, the engagement of a disk abutment with and riding off from said cam member moving the plate 50 toward the periphery of the disk and transferring the caps in front of the plate onto the conveyor C to extend substantially in a row transversely of the conveyor, as shown in Figure 4. As soon as a disk abutment rides off from the lever cam the plate 50 is returned by spring 54 to the position shown in Figure 1 to permit of a further transporting of caps in front of plate 50 to be transferred by said plate to the conveyor C by the successive movement of said plate.

It will be obvious that various modifications may be made in construction and arrangement of parts without departing from the scope of the invention.

Having thus described my invention, I claim:

1. In a machine for assembling sealing pads in receptacle closure caps, the combination with means for applying pressure to the sealing pads assembled in caps, of a rotating disk to which the caps are delivered from the pressure applying means, a conveyor, and means mounted relative to the disk to have reciprocatory movement radially thereof to transfer a series of caps from the disk to said conveyor, said caps being disposed transversely of the conveyor.

2. In a machine for assembling sealing pads in receptacle closure caps, the combination with a rotatable head embodying a shelf to which the caps with pads assembled therein are delivered and carrying means to place the pads in the caps under pressure, of an endless conveyor, a rotatable disk juxtaposed to and rotatable in the plane of the head shelf to which the caps are delivered from said shelf and having a peripheral portion superposed to the conveyor, and means intermittently operative in a direction radially of the disk and parallelly of the conveyor to transfer the caps from the disk to the conveyor.

3. The combination with a machine for assembling sealing pads in receptacle closure caps including means to apply pressure to pads assembled in caps, of a rotatable disk to which the caps are delivered from the pressure applying means, a belt conveyor to one end of which conveyor a peripheral portion of the disk is superposed in alinement with the longitudinal axis of said conveyor, and means reciprocatory in the line of travel of the conveyor and operative from the rotation of the disk to transfer caps from the disk to the belt conveyor.

4. In a machine for assembling sealing disks in receptacle closure caps, the combination with means for applying pressure to the pads in caps, of a traveling conveyor, a rotatable disk to receive assembled caps from the pressure means, means operative from the rotation of the disk and adapted to move radially of said disk to transfer a series of caps from the disk to the conveyor to extend transversely thereof, means to support the conveyor and disk from the frame of the assembling machine, and means to operatively connect and actuate the conveyor and disk from the driving shaft of the assembling machine.

5. The combination with a rotatable pressure plunger carrying head of closure cap assembling machines, of a traveling belt conveyor, a rotatable disk interposed between the conveyor and head with peripheral portions thereof continguous to the head and superposed to and in alinement with the longitudinal axis of the conveyor and adapted to receive assembled caps from the head, and means intermittently operative from the movement of the disk in a direction radially of the disk and parallelly of the conveyor to transfer caps from the disk to the conveyor.

6. In a closure cap assembling machine as claimed in claim 5, wherein the means to transfer the caps from the disk to the conveyor comprises an ejector normally urged to position within the periphery of the disk, a lever connected with the ejector, and abutments fixed in the disk adapted by the rotation of the disk to engage and actuate the lever to move the ejector toward the periphery of the disk.

7. In a closure cap assembling machine, the combination with a rotatable pressure plunger carrying head thereof, of a traveling belt conveyor, a rotatable disk interposed between the belt and head with peripheral portions thereof contiguous to the head and superposed to and end and in alinement with the longitudinal axis of the conveyor, means operative from the rotation of the head and disk to deliver assembled caps from the head to the disk, and means intermittently operative from the rotation of the disk to transfer a series of caps from the disk to the conveyor the caps extending transversely of the conveyor.

8. In a closure cap assembling machine, the combination with a rotatable pressure plunger carrying head thereof, of a traveling belt conveyor, a rotatable disk interposed between the belt and head with peripheral portions thereof contiguous to the head and superposed to an end of the conveyor, means operative from the rotation of the head and disk to deliver assembled caps from the head to the disk, and means intermittently operative from the rotation of the disk to transfer caps from the disk to the conveyor comprising an arcuate plate supported in edgewise relation above that portion of the disk superposed to the conveyor to extend in a direction radially of the conveyor and reciprocatory in the direction of travel of the conveyor, said plate being yieldingly urged to predetermined position within the periphery of the disk, means to direct the caps delivered from the head to the disk to a peripheral portion of the disk relative to the plate, a lever operatively connected to the plate, and abutments circumferentially disposed about and adapted by the rotation of the disk to move the lever and thereby the plate against the action of the yielding means to eject the caps on the disk in front of the plate to the conveyor.

9. In a closure cap assembling machine, the combination with a rotatable pressure plunger carrying head thereof, of a traveling belt conveyor, a rotatable disk interposed between the belt and head with peripheral portions thereof contiguous to the head and superposed to an end of the conveyor, means operative from the rotation of the head and disk to deliver assembled caps from the head to the disk, and means intermittently operative from the rotation of the disk to transfer caps from the disk to the conveyor comprising a bracket supported above the disk, an arcuate plate slidably supported in the bracket in edgewise relation above the portion of the disk superposed to the conveyor to extend transversely of the conveyor and have reciprocatory movement in the direction of travel of the conveyor, means to yieldingly urge the plate to predetermined position within the periphery of the disk, means carried by the bracket to direct the caps on the disk to the peripheral portion of the disk in front of the plate and prevent transporting of the caps by the disk beyond the plate, and means operative at predetermined intervals in the rotation of the disk to move the plate against the action of the yielding means to transfer the caps from the disk to the conveyor.

10. In a closure cap assembling machine, the combination with a rotatable pressure plunger carrying head thereof, of a traveling belt conveyor, a rotatable disk interposed between the belt and head with peripheral portions thereof contiguous to the head and superposed to an end of the conveyor, means operative from the rotation of the head and disk to deliver assembled caps from the head to the disk, and means intermittently operative from the rotation of the disk to transfer caps from the disk to the conveyor comprising a bracket supported above the disk, an arcuate plate slidably supported in the bracket in edgewise relation above the portion of the disk superposed to the conveyor to extend transversely of the conveyor and have reciprocatory movement in the direction of travel of the conveyor, means to yieldingly urge the plate to predetermined position within the periphery of the disk, means carried by the bracket to direct the caps on the disk to the peripheral portion of the disk in front of the plate and prevent transporting of the caps by the disk beyond the plate, a lever pivotally carried at one end by the bracket within the plate and the free end engaging the plate and carrying a cam member intermediate the ends, and abutments fixed to and equidistantly spaced about the disk adapted to co-operate with the lever cam at predetermined intervals in the rotation of the disk to actuate the lever and move the plate against the action of the yielding means to transfer caps from the disk to the conveyor.

11. In a machine for assembling sealing pads in receptacle closure caps, the combination with means for applying pressure to sealing pads assembled in the caps, of a traveling belt conveyor supported by rotatable drums, a rotatable disk to receive assembled caps from said pressure means, means operative from the rotation of the disk to transfer the caps from the disk to the conveyor, and means to actuate the conveyor and disk comprising a rotatable shaft carrying a worm operatively connected with the drive shaft of the assembling machine, and a pair of worm wheels each meshing with said worm, one worm wheel being connected with the disk and the other with a conveyor supporting drum.

12. In delivery means for machines for assembling sealing pads in receptacle closure caps, a bracket fixed to and extended laterally from the frame of the machine, drums carried by said bracket, a conveyor belt engaged about and supported by said drums, a disk to receive assembled caps from the machine carried by the bracket to rotate in the plane of travel of the conveyor belt and having a peripheral portion superposed to the conveyor belt, means superposed to and operative from the rotation of the disk to transfer caps from the disk to the conveyor belt, a worm carrying shaft operatively connected to and driven from the drive shaft of the assembling machine, and a pair of worm wheels meshing with said worm, one of said wheels being rotatable with the disk and the other operatively connected with a conveyor drum to actuate the disk and conveyor belt.

13. Delivery means for machines for assembling sealing pads in receptacle closure caps as claimed in claim 12, wherein the conveyor belt and disk supporting bracket embodies a shelf to support the upper stretch of the conveyor belt.

14. The combination with a machine for assembling sealing pads in receptacle closure caps, of a rotatable head arranged with a shelf to receive assembled caps from the cap assembling means and carrying plungers yieldingly urged toward the shelf to engage and place sealing pads in caps on the shelf under pressure, a traveling conveyor, a rotatable disk interposed between the head and conveyor, said disk being arranged to rotate in the plane of the head shelf and with a peripheral portion superposed to the conveyor, means to co-operate with the plungers by the rotation of the head to move the plungers to position away from the head shelf and retain them in said position during a predetermined portion of travel of the head, means to extend above the head shelf and disk arranged at that portion of the head shelf at which the plungers are moved away from the shelf and operative to direct and transfer the caps from the head shelf to the disk, and means to transfer the caps from the shelf to the conveyor.

15. In a machine for assembling sealing pads in receptacle closure caps, the combination with means for applying pressure to sealing pads assembled in the caps, of a traveling belt conveyor, a rotatable disk to receive assembled caps from said pressure means, means operative from the rotation of the disk to transfer a series of caps from the disk to the conveyor with the caps disposed transversely of the conveyor, and means to actuate the conveyor and rotate the disk arranged to reduce the speed of travel of the conveyor relative to the speed of rotation of the disk.

Signed at Brooklyn, in the county of Kings, city and State of New York, this 17th day of July, 1930.

JOHN A. JOHNSON.